(12) United States Patent
Lester (10) Patent No.: US 10,725,518 B2
(45) Date of Patent: Jul. 28, 2020

(54) TECHNIQUES TO ROUTE POWER TO A USB HOST IN DEAD BATTERY CONDITION

(71) Applicant: INTEL CORPORATION, Santa Clara, CA (US)

(72) Inventor: Scot Lester, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 453 days.

(21) Appl. No.: 15/495,940

(22) Filed: Apr. 24, 2017

(65) Prior Publication Data

US 2017/0293338 A1 Oct. 12, 2017

Related U.S. Application Data

(63) Continuation of application No. 14/565,308, filed on Dec. 9, 2014, now Pat. No. 9,632,555.

(51) Int. Cl.
*G06F 13/38* (2006.01)
*G06F 13/40* (2006.01)
*G06F 1/26* (2006.01)
*G06F 1/32* (2019.01)
*G06F 1/30* (2006.01)
*G06F 1/3212* (2019.01)
*G06F 13/00* (2006.01)
*G06F 1/3234* (2019.01)
*G06F 1/3296* (2019.01)
*H01H 23/24* (2006.01)

(52) U.S. Cl.
CPC ............... *G06F 1/30* (2013.01); *G06F 1/26* (2013.01); *G06F 1/266* (2013.01); *G06F 1/3212* (2013.01); *G06F 1/3253* (2013.01); *G06F 1/3296* (2013.01); *G06F 13/00* (2013.01); *G06F 13/385* (2013.01); *G06F 13/4022* (2013.01); *H01H 23/24* (2013.01); *Y02D 10/174* (2018.01)

(58) Field of Classification Search
CPC .... G06F 13/00; G06F 13/385; G06F 13/4022; G06F 1/26; G06F 1/266; G06F 1/30; G06F 1/3212; G06F 1/3253; G06F 1/3296; H01H 23/24
See application file for complete search history.

(56) References Cited

U.S. PATENT DOCUMENTS

| | | | |
|---|---|---|---|
| 9,310,868 B2 * | 4/2016 | Waters | G06F 1/266 |
| 9,766,674 B2 * | 9/2017 | Dunstan | G06F 13/385 |
| 9,767,060 B2 * | 9/2017 | Talmola | G06F 1/266 |
| 9,811,136 B2 * | 11/2017 | Waters | G06F 1/266 |
| 2003/0030412 A1 | 2/2003 | Matsuda | |
| 2009/0174366 A1 * | 7/2009 | Ahmad | H02J 7/0055 320/114 |

(Continued)

OTHER PUBLICATIONS

European Search Report for the European Patent Application No. 15867155, dated Jun. 8, 2018, 2 pages.

(Continued)

*Primary Examiner* — Abdelmoniem I Elamin (57) ABSTRACT

Examples may include routing power between a Universal Serial Bus (USB) host and a USB device. In some examples, the power may be routed from a power source at the USB device while the USB host is in a dead battery condition. Various switches at the USB host may be capable of selectively switching to route power from the power source to provide operating power to circuitry at the USB host.

15 Claims, 7 Drawing Sheets

(56) References Cited

U.S. PATENT DOCUMENTS

| | | | |
|---|---|---|---|
| 2013/0290765 A1* | 10/2013 | Waters | G06F 1/266 |
| | | | 713/340 |
| 2015/0378409 A1* | 12/2015 | Dunstan | G06F 13/385 |
| | | | 713/310 |
| 2016/0062935 A1* | 3/2016 | Talmola | G06F 1/266 |
| | | | 710/306 |
| 2017/0147052 A1* | 5/2017 | Waters | G06F 13/385 |

OTHER PUBLICATIONS

ON Semiconductor: "NCP362 USB Positive Overvoltage and Overcurrent Protection with TVS for Vbus and Low Capacitance ESD Diodes for Data", Jun. 30, 2010 (Jun. 30, 2010), pp. 1-16 URL:http://www.onsemi.com/pub -link/Collate ral/NCP362-D.PDF.

* cited by examiner

FIG. 1

System 200

Scenario 210

Scenario 220

CONTROL A FIRST SWITCH HAVING A SINGLE POLE, SINGLE TOGGLE SWITCH CONFIGURATION THAT IS CAPABLE OF ROUTING A FIRST VOLTAGE LEVEL FROM A FIRST POWER SOURCE LOCATED AT OR COUPLED WITH THE USB HOST TO THE USB DEVICE WHILE THE FIRST SWITCH IS IN A CLOSED POSITION
502

CONTROL A SECOND SWITCH HAVING THE SINGLE POLE, SINGLE TOGGLE SWITCH CONFIGURATION THAT IS CAPABLE OF ROUTING A SECOND VOLTAGE LEVEL FROM THE USB HOST TO THE USB DEVICE WHILE THE SECOND SWITCH IS IN A CLOSED POSITION, MAINTAINING THE SECOND SWITCH IN AN OPEN POSITION DURING A DEAD BATTERY CONDITION THAT INCLUDES A SECOND POWER SOURCE AT THE USB DEVICE PROVIDING OPERATING POWER AT THE SECOND VOLTAGE LEVEL TO CIRCUITRY AT THE USB HOST THROUGH THIRD AND FOURTH SWITCHES
504

*FIG. 5*

Storage Medium 600

*Computer Executable Instructions for 500*

TECHNIQUES TO ROUTE POWER TO A USB HOST IN DEAD BATTERY CONDITION

CROSS-REFERENCE TO RELATED APPLICATION

This application is a continuation of, claims the benefit of, and claims priority to U.S. patent application Ser. No. 14/565,308 on Dec. 9, 2014, now U.S. Pat. No. 9,632,555 the subject matter of which is incorporated herein by reference in its entirety.

TECHNICAL FIELD

Examples described herein are generally related to routing power at a computing device.

BACKGROUND

A relatively new specification for Universal Serial Bus (USB) compliant devices is the Universal Serial Bus Power Delivery Specification, Rev. 2.0, V1.0, published in August 2014, hereinafter referred to as the USB-PD specification. The USB-PD specification describes ways for USB devices to deliver power over a USB cable and through USB ports at a "provider" or source to a "consumer" or sink. The provider may be a USB host and the consumer may be a USB device. In some examples, approximately 5 volts (V) of power may be provided by power sources located at or coupled with a USB host to provide power to a USB device. In other examples, higher voltage levels of approximately 12V or 20V may be provided to the USB device.

The USB-PD specification also describes a scenario where a consumer may at least temporarily switch roles and may provide operating power to the provider. This scenario is called a dead battery condition. In some examples, a USB-PD provider controller at the provider may control a switch to allow power to be routed from the consumer to provide operating power to circuitry at the provider. For these examples, if the provider does not have power then the USB-PD provider controller may use 5V of power from a power source at the consumer to power up and negotiate with a USB-PD consumer controller at the consumer. Negotiations may include timing for closing the switch to enable the 5V voltage level to be routed to the circuitry at the provider.

DETAILED DESCRIPTION

As contemplated in the present disclosure, a dead battery condition may include a scenario where a consumer device may at least temporarily switch or reverse roles and provide power to a dead battery provider from a first power source. In some examples, the dead battery provider may be connected to a second power source (e.g., a fixed power outlet or charged battery) that enables the provider to again provide power to the consumer. Current implementations may include at least a few seconds where power from the first power source at the consumer and the second, newly connected power source may be shorted until a USB-PD provider controller completes negotiation with a USB-PD consumer controller to change roles again. The shorting of power from the two power sources could allow for possibly large current flows that may damage circuitry and/or wiring at the provider. It is with respect to these and other challenges that the examples described herein are needed.

Techniques to route power to a USB host in dead battery condition may be implemented by the USB host via one or more example methods. In some examples, an implemented method may include receiving, at a first switch, a first signal from a voltage regulator indicating whether power at a first voltage level is being received by the voltage regulator from a first power source located at or coupled to the USB host. The method may also include selecting a first closed position of the first switch based on the first signal indicating that power at the first voltage level is not being received by the voltage regulator. The method may also include receiving, at a second switch, power at a second voltage level from a second power source located at a USB device coupled to the USB host through a USB-PD capable port at the USB host and closing the second switch based on the power at the second voltage level falling within a range of voltage levels. The method may also include routing the power at the second voltage level from the second power source through the closed second switch to provide operating power to circuitry at the USB host.

Techniques to route power to a USB host in dead battery condition may also include the USB host having a USB-PD capable port arranged to route power to or from a USB device coupled to the USB host through the USB-PD capable port. The USB host may also have a first switch having a single pole, single toggle switch configuration capable of routing a first voltage level from the USB host to the USB device while the first switch is in a closed position. The USB host may also have a second switch having the single pole, single toggle switch configuration capable of routing a second voltage level from the USB host to the USB device while the second switch is in a closed position. The USB host may also have a third switch having a double pole, single toggle switch configuration capable of routing the second voltage level to provide operating power to circuitry at the USB host. A first closed position of the third switch may route the second voltage level from a first power source at the USB device. A second closed position of the third switch may route the second voltage level from a second power source located at or coupled with the USB host. The USB host may also have a fourth switch having the single pole, single toggle switch configuration that is capable of switching to a closed position if the second voltage level is within a range of voltage levels and the third switch is the first closed position.

Figure 1:
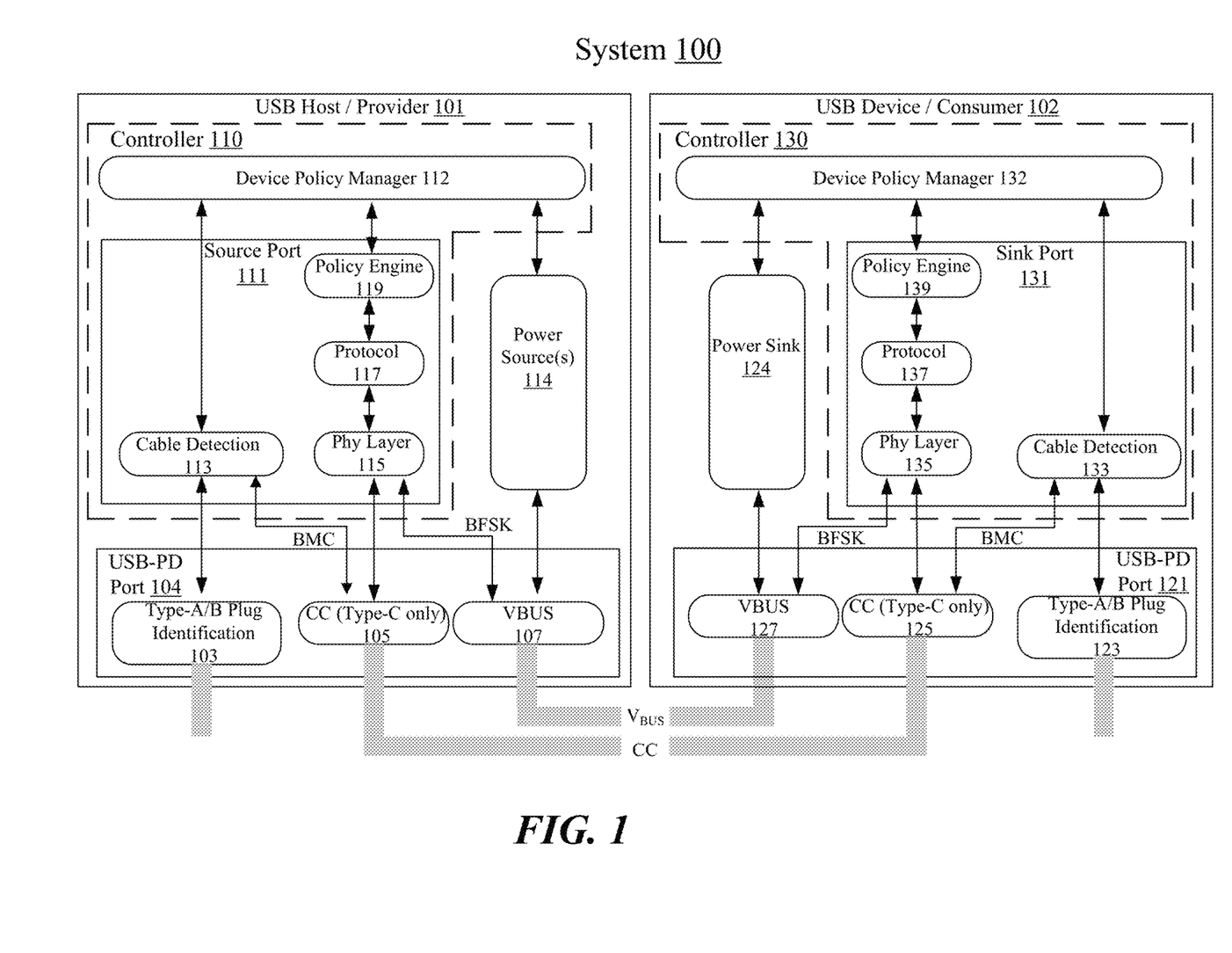
FIG. 1 illustrates an example first system.

FIG. 1 illustrates an example first system. As shown in FIG. 1, the example first system includes a system 100. In some examples, as shown in FIG. 1, system 100 includes a USB host/provider 101 and a USB device/consumer 102. In some examples, USB host 101 may be coupled to USB device 102 through two attached ports shown in FIG. 1 as USB-PD port 104 and USB-PD port 121. Both USB host 101 and USB device 102 may be arranged to route power in accordance with the USB-PD specification.

In some examples, power may be routed from USB host 101 from power source(s) 114 through VBUS 107 in USB-PD port 104 and then through VBUS 127 in USB-PD port 121 to power sink 124 at USB device 102. Power source(s) 114 may include, but are not limited to, a battery located at USB host 101 or an external power source coupled with USB host 101 such as another battery or power outlet arranged as a fixed power source. Power sink 124 may include a battery located at USB device 102 as well as circuitry at USB device 102 that may receive operating power routed from power source(s) 114.

According to some examples, the arrangement shown in FIG. 1 depicts separate communication stacks associated with source port 111 and sink port 131 to enable logic and/or features of controller 110 at USB host 101 to communicate with controller 130 at USB device 102. Source port 111's communication stack includes physical (phy) layer 115, protocol 117 and policy engine 119. Sink port 131's communication stack includes phy layer 135, protocol 137 and policy engine 139. Each of these communication stacks are further in communication with respective device policy managers 112 and 132 to allow for monitoring and/or control of a USB-PD system within USB host 101 or USB device 102.

In some examples, source port 111 and sink port 131 of respective controllers 110 and 130 may include cable detection logic to detect a type of cable attached between USB-PD 101 and USB-PD 121. As shown in FIG. 1, the cable detection logic may include cable detection 113 and cable detection 133. For these examples, both power and USB-PD signaling for type-A/B plugs/cables may be routed over the VBUS. Binary frequency shift keyed (BFSK) signaling may be utilized for USB type A/B cables to relay or route USB-PD signaling through the VBUS and to respective communication stacks for source port 111 and sink port 131. In other examples, for type-C plugs/cables, a standard USB communication bus (CC) may be used to relay or route USB-PD signaling. For these other examples, biphase mark coding (BMC) signaling may be used to indicate type-C plugs/cables to cable detection 113 and cable detection 133.

In some examples, device policy managers 112 and 132 may communicate with respective communication stacks in source/sink ports 111/131 and cable detections 113/133 in order to manage resources of USB host 101 to provide power to USB device 102. Also, as described more below, logic and/or features of controller 110 or controller 130 (e.g., device policy managers 112/132) may be capable of orchestrating a role reversal in a scenario such as a dead battery condition (e.g., power source(s) 114 include a dead battery). The role reversal may include USB device 102 at least temporarily providing power to USB host 101.

Figure 2:
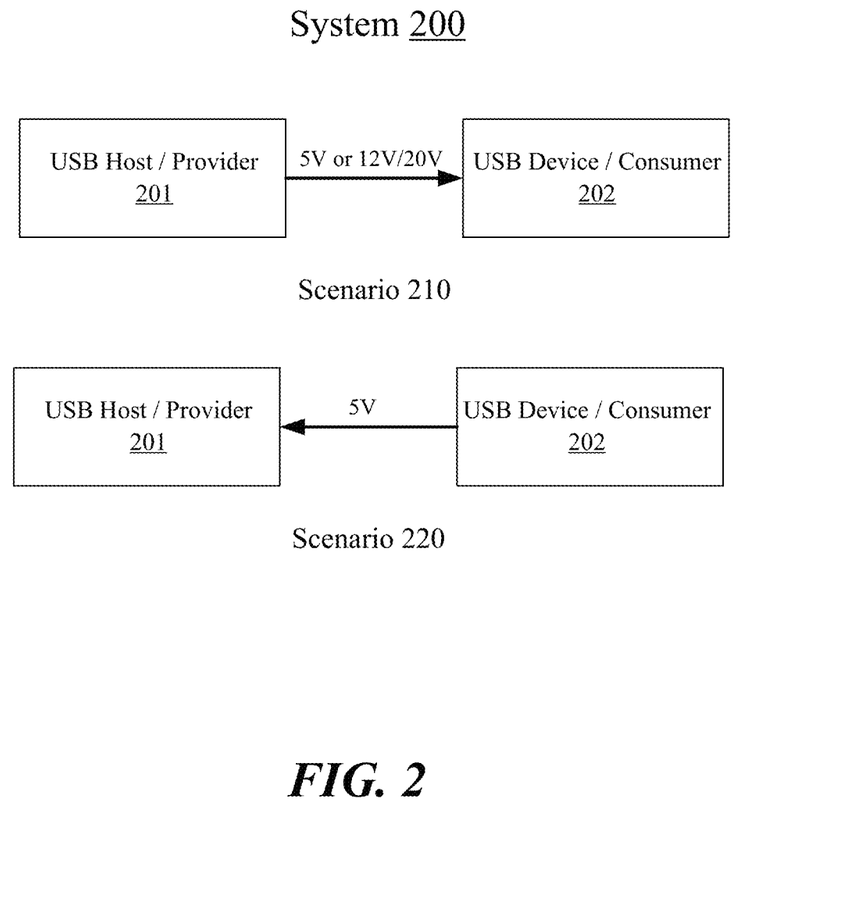
FIG. 2 illustrates an example second system.

FIG. 2 illustrates an example second system. As shown in FIG. 2, the example second system includes a system 200. In some examples, as shown in FIG. 2, scenario 210 depicts a USB host/provider 201 routing power at either a first voltage level of approximately 5V or a second, higher voltage level of approximately 12V or approximately 20V to USB device/consumer 202. Scenario 210 may include USB host 201 functioning in a provider role in accordance with the USB-PD specification to route power from a first power source located at or with USB host 201 (e.g., internal battery) or coupled with USB host 201 (e.g., external battery or power outlet). Scenario 210 may also include USB device 202 functioning in a consumer role in accordance with the USB-PD specification to receive or consume power routed from USB host 201.

According to some examples, as shown in FIG. 2 for scenario 220, USB device 202 may reverse roles and function in a provider role to route power at a voltage level of approximately 5V. Scenario 220 may be for a dead battery condition that has a first power source at USB host 201 (e.g., an internal battery) that is unable to provide adequate power (e.g., approximately 5V) to USB device 201. Also, the first power source may also be inadequate to power circuitry at USB host 201 such as a USB-PD controller and/or other circuitry (e.g., memory, central processor unit (CPU), etc.). For these examples, at least initially, the voltage level of 5V provided by USB device 202 may be used to power up the circuitry at USB host 201. As described more below, various switches may be configured at a USB host such as USB host 201 to ensure power can be provided to internal circuitry and yet avoid potentially shorting of power if USB host 201 starts to receive power from a new power source such as a power outlet or external battery.

Figure 3:
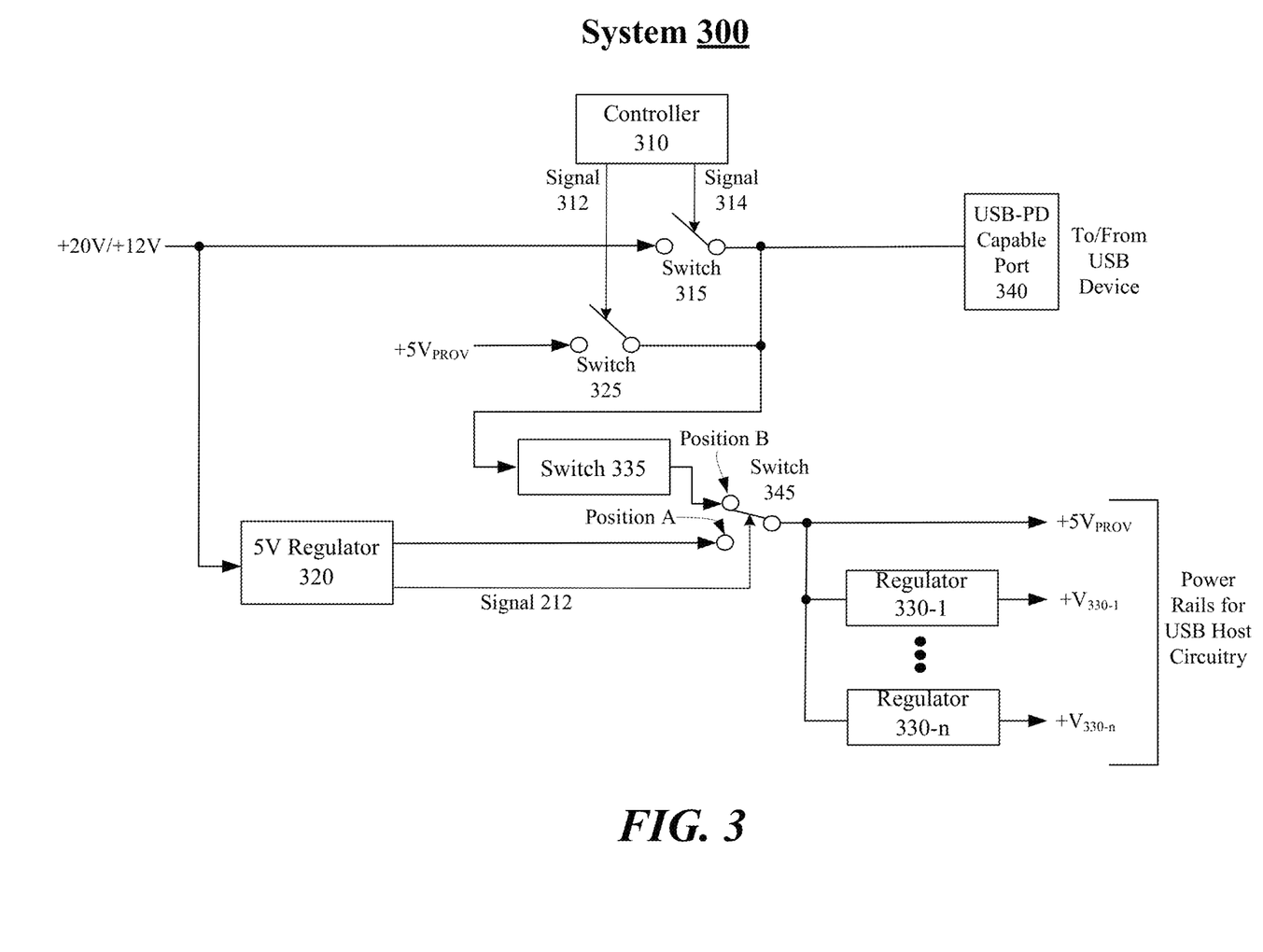
FIG. 3 illustrates an example third system.

FIG. 3 illustrates an example third system. As shown in FIG. 3, the example third system includes a system 300. In some examples, system 300 may be located at a USB host/provider arranged to route power through USB-PD capable port 340 to a USB device/consumer in accordance with the USB-PD specification. Also, in a dead battery condition for the USB host, system 300 may also be capable of routing power from the USB device/consumer to provide operating power through USB-PD capable port 340 to a controller 310 and/or power rails for other USB host circuitry.

In some examples, as shown in FIG. 3, system 300 includes switches 315, 325, 335 and 345 that may be selectively switched to enable one or more voltage levels to be routed to/from USB device and/or to power rails for USB host circuitry. For these examples, different switches or switch combinations may be closed or opened depending of whether the USB host is serving as a provider of power or is in a dead battery condition and thus the USB device is serving as the provider of power.

According to some examples, when the USB host is serving as a provider, a first voltage level of either +12V or +20V may be routed from a first power source located at or coupled with the USB host to 5V regulator 320 and switch 315. For these examples, logic and/or features at controller 310 may activate signal 314 to cause switch 315 to close if the first voltage level is to be routed through USB-PD capable port 340. Switch 315 may be a discrete transistor in a single pole, single toggle switch configuration as shown in FIG. 3. If a second voltage level of +5V is to be routed through USB-PD capable port 340 then the logic and/or features at controller may activate signal 312 to cause switch 325 to close. Switch 325 may also be a discrete transistor in the single pole, single toggle switch configuration. The +5V$_{PROV}$ shown in FIG. 3 illustrates the providing of this second voltage level. Although not shown in FIG. 3, additional voltage regulators may be used to provide this second voltage level.

In some examples, when the USB host is serving as a provider, the first voltage level routed from the first power source at or coupled with the USB host to 5V regulator 320 may cause 5V regulator 320 to become powered and to output the second voltage level of +5V. For these examples, responsive to becoming powered, 5V regulator 320 may output a signal 212 that causes switch 345 to switch to closed position A. Switch 345 may be a discrete transistor in a double pole, single toggle switch configuration. While switch 345 is in closed position A, the second voltage level of +5V output from 5V regulator 320 is routed to power rails for USB host circuitry. The second voltage level may also power regulator's 330-1 to 330-$n$, where "n" equals any positive whole integer >1, to output a multitude of voltage levels +V$_{330-1}$ to V$_{330-n}$ to power rails for USB host circuitry.

According to some examples, when the USB host is in a dead battery condition the USB device may route the second voltage level of +5V through USB-PD capable port 340 from a second power source located at or with the USB device. For these examples, both switch 315 and 325 may be maintained in an open position. Switch 335 may have a single pole, single toggle switch configuration capable of switching to a closed position if the second voltage level from the USB device is within a range of voltage levels. In other words, if the second voltage level is above an under voltage (UV) level and below an over voltage (OV) level. For example, the range of voltage levels may be +4.5V to +5.5V. For this range, the UV level would be +4.5V and the OV level would be +5.5V. The OV level may prevent a higher voltage from temporarily routing through switch 335 if the USB host should be connected to power source that causes controller 310 to close switch 315 and resulting in the higher first voltage level driving a possibly damagingly high current flow towards switch 335. The UV level may block unacceptably low voltage levels that may be received from the USB device (e.g., due to a low battery at the USB device or a poor connection). For these examples, switch 335 may include programmable logic capable of selectively closing switch 335 based on the range of voltage levels. Alternatively, switch 335 may include discrete transistors and comparators capable of selectively closing switch 335 based on the range of voltage levels.

Also for examples when the USB host is in a dead battery condition, 5V regulator 320 is not powered or receiving the first voltage level of +12V or +20V. Absence of signal 212 from 5V regulator 320 may cause switch 345 to be in closed position B. Switch 345 in closed position B along with switch 335 also in a closed position may enable power at the second voltage level of +5V to be routed from the USB device to power rails for USB host circuitry.

Figure 4:
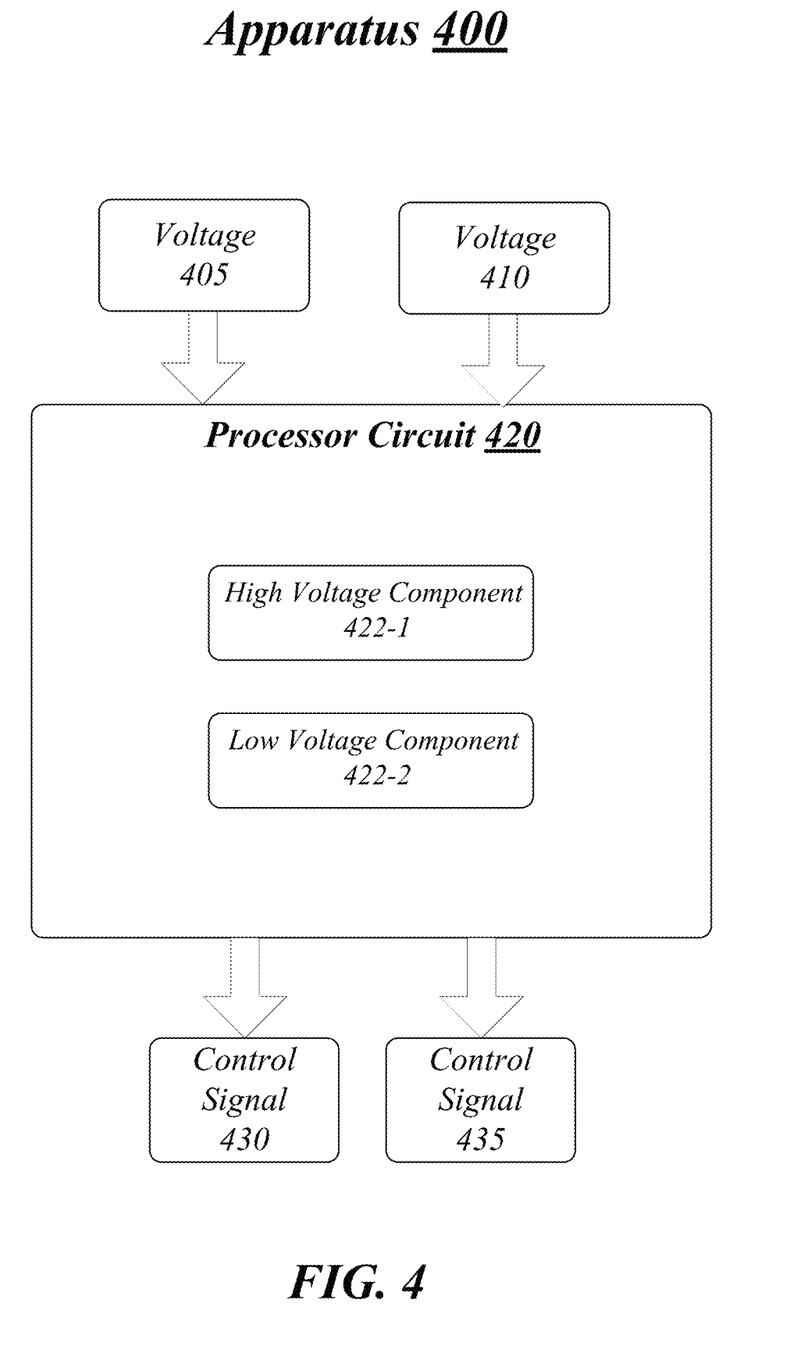
FIG. 4 illustrates an example block diagram for an apparatus.

FIG. 4 illustrates an example block diagram for an apparatus 400. Although apparatus 400 shown in FIG. 4 has a limited number of elements in a certain topology, it may be appreciated that the apparatus 400 may include more or less elements in alternate topologies as desired for a given implementation.

The apparatus 400 may be supported by processor circuit 420 maintained at or with a controller for a USB host that may be arranged to operate in compliance with the USB-PD specification. Processor circuit 420 may be arranged to execute one or more software or firmware implemented components 422-a. It is worthy to note that "a" and "b" and "c" and similar designators as used herein are intended to be variables representing any positive integer. Thus, for example, if an implementation sets a value for a=2, then a complete set of software or firmware for components 422-a may include components 422-1 or 422-2. The examples presented are not limited in this context and the different variables used throughout may represent the same or different integer values.

According to some examples, processor circuit 420 may include a processor or processor circuitry. The processor or processor circuitry can be any of various commercially available processors. Processor circuit 420 may also be an application specific integrated circuit (ASIC) and at least some components 422-a may be implemented as hardware elements of the ASIC.

According to some examples, apparatus 400 may include a high voltage component 422-1. High voltage component 422-1 may be executed by processor circuit 420 to control a first switch having a single pole, single toggle switch configuration that is capable of routing a first voltage level from a first power source located at or coupled with the USB host to the USB device while the first switch is in a closed position. For these examples, voltage 405 may include the first voltage level (e.g., 12V or 20V) and the first power source may include a battery located at or with the USB host or a power source coupled with or external to the USB host. The first switch may have a similar configuration as switch 315 as shown in FIG. 3.

In some examples, apparatus 400 may also include a low voltage component 422-2. Low voltage component 422-2 may be executed by processor circuit 420 to control a second switch having the single pole, single toggle switch configuration that is capable of routing a second voltage level from the USB host to the USB device while the second switch is in a closed position. For these examples, low voltage component 422-2 may be capable of maintaining the second switch in an open position during a dead battery condition that includes a second power source at the USB device providing operating power at the second voltage level to circuitry at the USB host through third and fourth switches. Voltage 410 may include the second voltage level (e.g., 5V) and the second power source may include a battery located at or with the USB device. The second, third and fourth switches may have similar configurations as respective switches 325, 345 and 335 as shown in FIG. 3.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
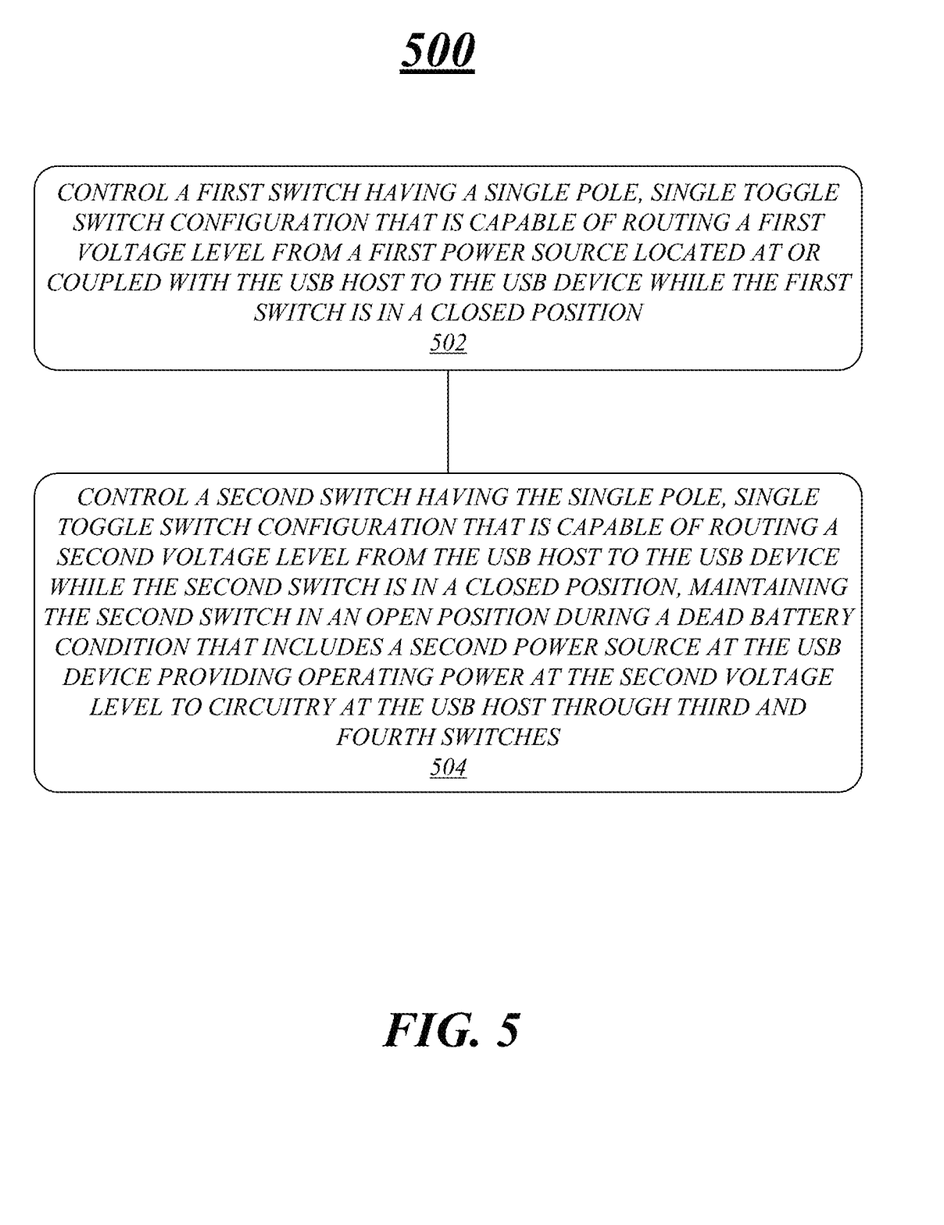
FIG. 5 illustrates an example of a logic flow.

FIG. 5 illustrates an example of a first logic flow. As shown in FIG. 5 the first logic flow includes a logic flow 500. Logic flow 500 may be representative of some or all of the operations executed by one or more logic, features, or devices described herein, such as apparatus 700. More particularly, logic flow 500 may be implemented by high voltage component 422-1 or low voltage component 422-2.

According to some examples, logic flow 500 at block 502 may control a first switch having a single pole, single toggle switch configuration that is capable of routing a first voltage level from a first power source located at or coupled with the USB host to the USB device while the first switch is in a closed position. For these examples, high voltage component 422-1 may control the first switch to route the first voltage level that may include, but is not limited to, a voltage of approximately 12V or 20V.

In some examples, logic flow 500 at block 504 may control a second switch having the single pole, single toggle switch configuration that is capable of routing a second voltage level from the USB host to the USB device while the second switch is in a closed position, maintaining the second switch in an open position during a dead battery condition that includes a second power source at the USB device providing operating power at the second voltage level to circuitry at the USB host through third and fourth switches. For these examples, low voltage component 422-1 may control the second switch to route the second voltage level that may include, but is not limited to, a voltage of approximately 5V. Low voltage component 422-1 may also be capable of maintaining the second switch in the open position during a dead battery condition to avoid or prevent a shorting condition should power be restored to the USB host (e.g., from an external power source).

Figure 6:
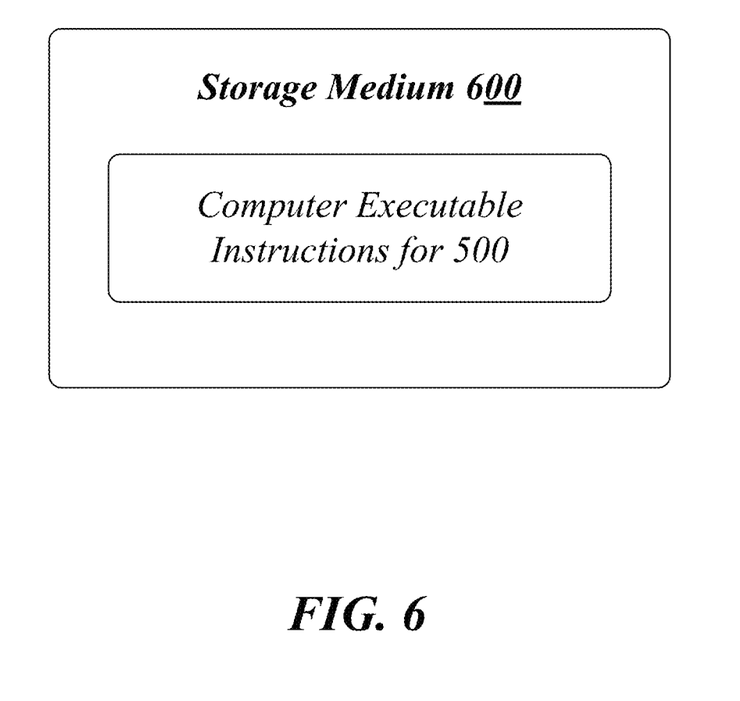
FIG. 6 illustrates an example of a storage medium.

FIG. 6 illustrates an example of a first storage medium. As shown in FIG. 6, the first storage medium includes a storage medium 600. The storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
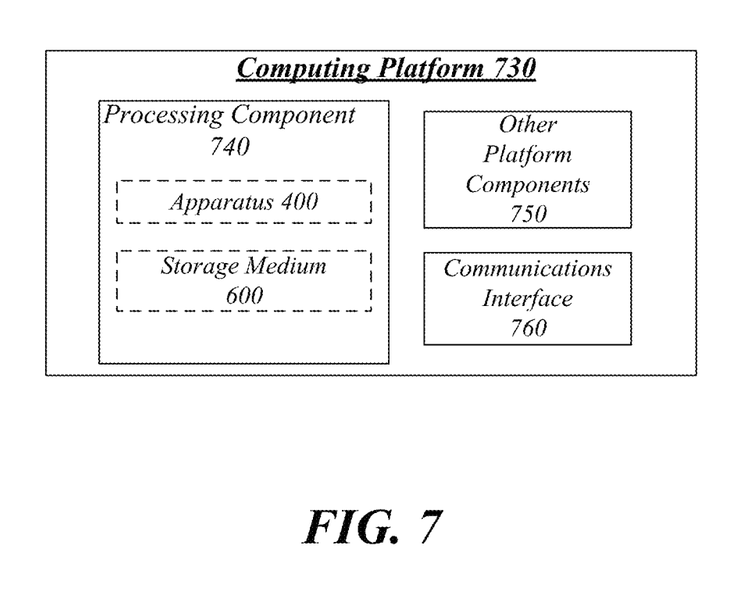
FIG. 7 illustrates an example computing platform.

FIG. 7 illustrates an example computing platform 700. In some examples, as shown in FIG. 7, computing platform 700 may include a processing component 740, other platform components or a communications interface 760. According to some examples, computing platform 700 may be part of a host computing platform as mentioned above.

According to some examples, processing component 740 may execute processing operations or logic for apparatus 400 and/or storage medium 600. Processing component 740 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 750 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 760 may include logic and/or features to support a communication interface. For these examples, communications interface 760 may include one or more communication interfaces that operate according to various communication protocols or standards to communicate over direct or network communication links. Direct communications may occur via use of communication protocols or standards described in one or more industry standards (including progenies and variants) such as those associated with the SMBus specification, the PCI Express specification or the USB specification that includes the USB-PD specification. Network communications may occur via use of communication protocols or standards such those described in one or more Ethernet standards promulgated by the Institute of Electrical and Electronics Engineers (IEEE). For example, one such Ethernet standard may include IEEE 802.3-2008, Carrier sense Multiple access with Collision Detection (CSMA/CD) Access Method and Physical Layer Specifications, Published in December 2008 (hereinafter "IEEE 802.3").

Computing platform 700 may be part of a computing device functioning as a USB host for a USB device. The computing device may include, but is not limited to a computer, a personal computer (PC), a desktop computer, a laptop computer, a notebook computer, a netbook computer, a tablet computer, an ultra-book computer. In some examples, the computing device functioning as the USB host and the USB device may both be part of a convertible or 2-in-1 computer. For these examples, the USB host may be a base computing platform including computing, memory, storage and input (e.g., keyboard) capabilities and the USB device may be a removable touch screen tablet having stand-alone computing, memory and storage capabilities. Accordingly, functions and/or specific configurations of computing platform 700 described herein, may be included or omitted in various embodiments of computing platform 700, as suitably desired.

The components and features of computing platform 700 may be implemented using any combination of discrete circuitry, application specific integrated circuits (ASICs), logic gates and/or single chip architectures. Further, the features of computing platform 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the example computing platform 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include an USB-PD capable port at a USB host arranged to route power to or from a USB device coupled to the USB host through the USB-PD capable port. The apparatus may also include a first switch having a single pole, single toggle switch configuration capable of routing a first voltage level from the USB host to the USB device while the first switch is in a closed position. The apparatus may also include a second switch having the single pole, single toggle switch configuration capable of routing a second voltage level from the USB host to the USB device while the second switch is in a closed position. The apparatus may also include a third switch having a double pole, single toggle switch configuration capable of routing the second voltage level to provide operating power to circuitry at the USB host, a first closed position of the third switch to route the second voltage level from a first power source at the USB device. A second closed position of the third switch may route the second voltage level from a second power source located at or coupled with the USB host. The apparatus may also include a fourth switch having the single pole, single toggle switch configuration that is capable of switching to a closed position if the second voltage level is within a range of voltage levels and the third switch is the first closed position.

Example 2

The apparatus of example 1 may also include a first voltage regulator arranged to receive the first voltage level from the second power source and generate a signal to cause the third switch to be in the second closed position while the second voltage level is being received or to be in the first closed position while the second voltage level is not being received.

Example 3

The apparatus of example 1, the first voltage may be one of approximately 12 volts or approximately 20 volts and the second voltage may be approximately 5 volts.

Example 4

The apparatus of example 3, the range of voltage levels may be 4.5 volts to 5.5 volts.

Example 5

The apparatus of example 1, the first power source may include a battery at the USB device.

Example 6

The apparatus of example 1, the second power source may be a first battery located at the USB host or an external power source coupled with the USB host.

Example 7

The apparatus of example 6, the external power source may be a second battery or a power outlet arranged as a fixed power source.

Example 8

The apparatus of example 1 may also include a USB-PD controller arranged to operate in compliance with one or more USB specifications including the Universal Serial Bus Power Delivery specification. The USB-PD controller may be capable of controlling the first and the second switches to route the first or the second voltage levels to the USB device arranged as a USB-PD consumer.

Example 9

The apparatus of example 8, the USB-PD controller may be capable of maintaining the second switch in an open position during a dead battery condition that includes the USB-PD consumer device providing operating power from the first power source to the circuitry at the USB host.

Example 10

An example method implemented at a USB host may include receiving, at a first switch, a first signal from a voltage regulator indicating whether power at a first voltage level is being received by the voltage regulator from a first power source located at or coupled to the USB host. The method may also include selecting a first closed position of the first switch based on the first signal indicating that power at the first voltage level is not being received by the voltage regulator. The method may also include receiving, at a second switch, power at a second voltage level from a second power source located at a USB device coupled to the USB host through a USB-PD capable port at the USB host. The method may also include closing the second switch based on the power at the second voltage level falling within a range of voltage levels. The method may also include routing the power at the second voltage level from the second power source through the closed second switch to provide operating power to circuitry at the USB host.

Example 11

The method of example 10 may also include receiving, at the first switch, a second signal from the voltage regulator indicating whether power at the first voltage level is being received by the voltage regulator from the first power source. The method may also include selecting a second closed position of the first switch based on the second signal indicating that power at the first voltage level is being received by the voltage regulator. The method may also include routing power at the first voltage level outputted from the voltage regulator through the first switch in the second closed position to provide operating power to the circuitry at the USB host.

Example 12

The method of example 10, the first voltage may be one of approximately 12 volts or approximately 20 volts and the second voltage may be approximately 5 volts.

Example 13

The method of example 12, the range of voltage levels may be 4.5 volts to 5.5 volts.

Example 14

The method of example 10, the second power source may include a battery at the USB device.

Example 5

The method of example 10, the second power source may include a first battery located at the USB host or an external power source coupled with the USB host

Example 16

The method of example 15, the external power source may include a second battery or a power outlet arranged as a fixed power source.

Example 17

The method of example 10, the USB host and the USB device may be arranged to operate in compliance with one or more USB specifications including the Universal Serial Bus Power Delivery specification. The USB host may be arranged as a USB-PD provider and the USB device arranged as a USB-PD consumer while power at the first voltage level is received by the voltage regulator.

Example 18

The method of example 17, the USB host may be arranged as a USB-PD consumer and the USB device arranged as a USB-PD consumer while power at the second voltage level is received from the second power source located at the USB device.

Example 19

An example apparatus may include means for performing the methods of any one of examples 10 to 18.

Example 20

An example apparatus may include a processor circuit for a controller at a USB host arranged to route power to or from a USB device coupled to the USB host through a USB-PD capable port. The apparatus may also include a high voltage component for execution by the processor circuit to control a first switch having a single pole, single toggle switch configuration that is capable of routing a first voltage level from a first power source located at or coupled with the USB host to the USB device while the first switch is in a closed position. The apparatus may also include a low voltage component for execution by the processor circuit to control a second switch having the single pole, single toggle switch configuration that is capable of routing a second voltage level from the USB host to the USB device while the second switch is in a closed position. The low voltage component may be capable of maintaining the second switch in an open position during a dead battery condition that includes a second power source at the USB device providing operating power at the second voltage level to circuitry at the USB host through third and fourth switches.

Example 21

The apparatus of example 20, the third switch may have a double pole, single toggle switch configuration that includes a first closed position to route the second voltage level from the first power source to the circuitry at the USB host and a second closed position to route the second voltage level from the second power source located at or coupled with the USB host. The third switch may be capable of switching to the second closed position following the USB host exiting the dead battery condition.

Example 22

The apparatus of example 21, the fourth switch may have the single pole, single toggle switch configuration that may be capable of switching to a closed position if the second voltage level routed from the first power source is within a range of voltage levels and the third switch is in the first closed position. The fourth switch in the closed position may be capable of routing the second voltage level to the circuitry at the USB host to provide the operating power.

Example 23

The apparatus of example 22, the first voltage may be one of approximately 12 volts or approximately 20 volts and the second voltage may be approximately 5 volts.

Example 24

The apparatus of example 23, the range of voltage levels may be 4.5 volts to 5.5 volts.

Example 25

The apparatus of example 20, the second power source may include a battery at the USB device.

Example 26

The apparatus of example 20, the first power source may include a first battery located at the USB host or an external power source coupled with the USB host.

Example 27

The apparatus of example 26, the external power source may include a second battery or a power outlet arranged as a fixed power source.

Example 28

The apparatus of example 20, the controller may be arranged to operate in compliance with one or more USB specifications including the Universal Serial Bus Power Delivery specification. The controller may be capable of controlling the first and the second switches to route the first or the second voltage levels to the USB device arranged as a USB-PD consumer.

Example 29

The apparatus of example 28, the controller may be capable of maintaining the second switch in an open position during a dead battery condition comprises the USB-PD consumer device providing operating power from the second power source to the circuitry at the USB host.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
a universal serial bus (USB) port comprising a voltage bus;
first power source circuitry coupled to the USB port, the first power source circuitry to route power from a first power source, via the voltage bus of the USB port, to circuitry of a USB host when a first voltage level, at the voltage bus of the USB port, is less than or equal to a first threshold and a second voltage level provided to a voltage regulator, at the USB host, is less than or equal to a second threshold; and a second power source to provide power to the circuitry of the USB host when the second voltage level provided to the voltage regulator is greater than or equal to a the second threshold.

2. The system of claim 1, the first voltage level provided by the first power source and the second voltage level provided by the second power source.

3. The system of claim 2, the first power source comprising a battery at a USB device.

4. The system of claim 2, the second power source comprising a first battery located at the USB host or an external power source coupled with the USB host.

5. The system of claim 4, the external power source comprising a second battery or a power outlet arranged as a fixed power source.

6. The system of claim 1, the first power source to route power from the first power source, via the voltage bus of the USB port, to circuitry of a USB host when the first voltage level, at the voltage bus of the USB port, is less than or equal to a first threshold and greater than or equal to a third threshold.

7. The system of claim 6, wherein the third threshold equals 4.5 Volts (V) and the first threshold equals 5.5 V.

8. The system of claim 1, wherein the second threshold is less than the first threshold.

9. An apparatus comprising:
a universal serial bus (USB) port comprising a voltage bus;
a first power source;
a voltage regulator coupled to the first power source; and
host circuitry arranged to receive power from the first power source and provide power to the voltage bus when a first voltage level at the voltage regulator is greater than a first threshold and to receive power from the voltage bus when the first voltage level is less than or equal to the first threshold and a second voltage level at the voltage bus is greater than or equal to a second threshold.

10. The apparatus of claim 9, the first power source comprising a first battery or an external power source coupled to the apparatus.

11. The apparatus of claim 10, the second voltage level provided by a second power source at a USB device coupled to the USB port.

12. The apparatus of claim 11, the second power source a second battery or an external power source coupled to the USB device.

13. The apparatus of claim 9, the host circuitry arranged to receive power from the voltage bus when the second voltage level at the voltage bus is greater than or equal to the second threshold and less than or equal to a third threshold.

14. The apparatus of claim 13, wherein the second threshold equals 4.5 Volts (V) and the third threshold equals 5.5 V.

15. The apparatus of claim 9, wherein the first threshold is less than or equal to the second threshold.

* * * * *